May 19, 1970     F. A. SUMMERLIN ET AL     3,512,448
BLIND FASTENER
Original Filed Feb. 13, 1967     3 Sheets-Sheet 1
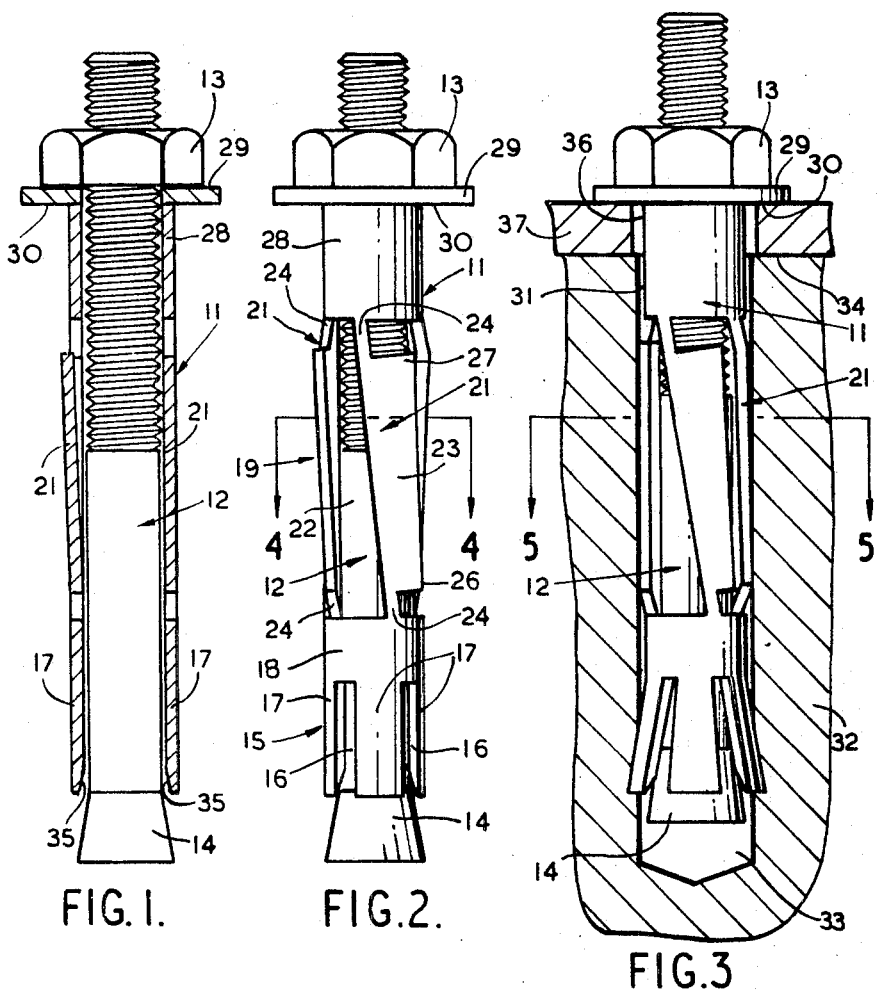
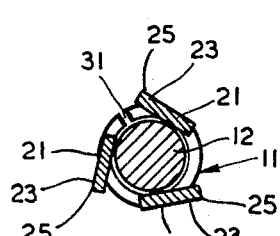
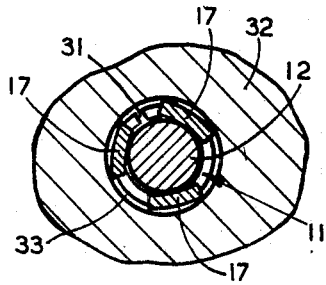
Inventors
Frederick A. Summerlin
Harvey P. Jeal
By Lemon, Palmer,
Stewart & Estabrook
Attorney

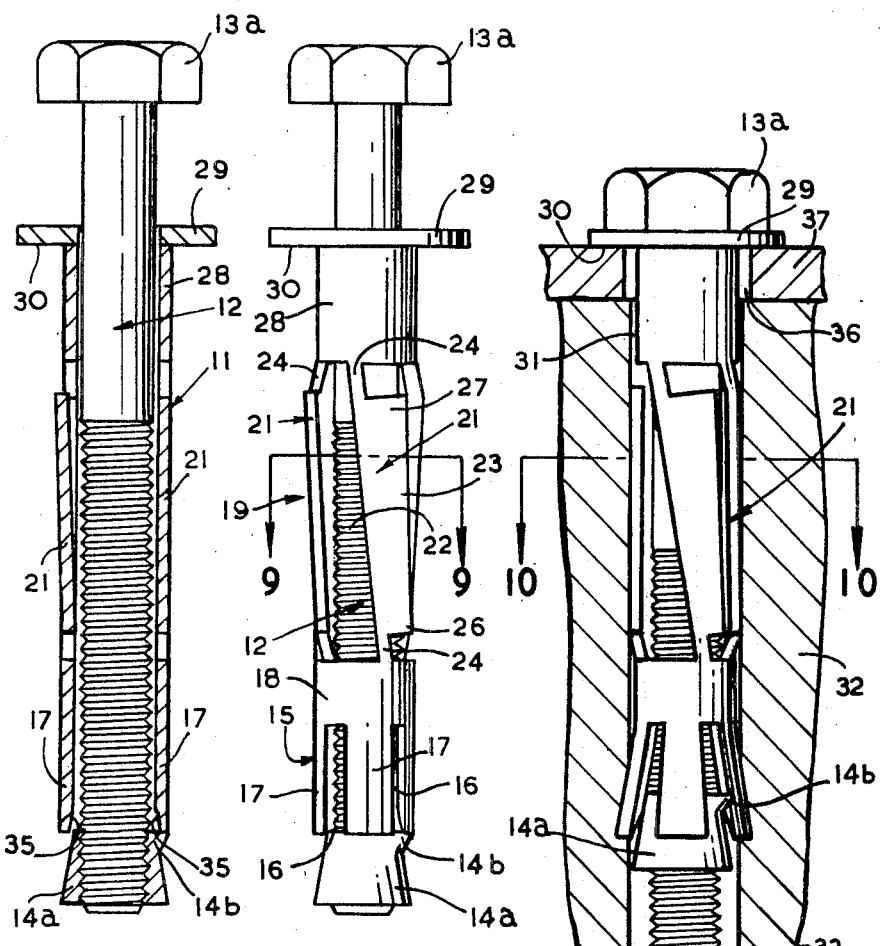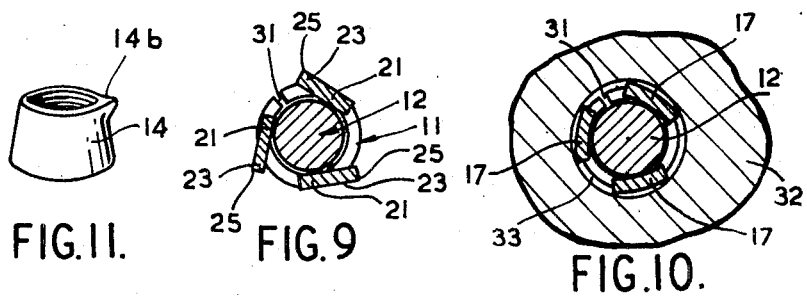

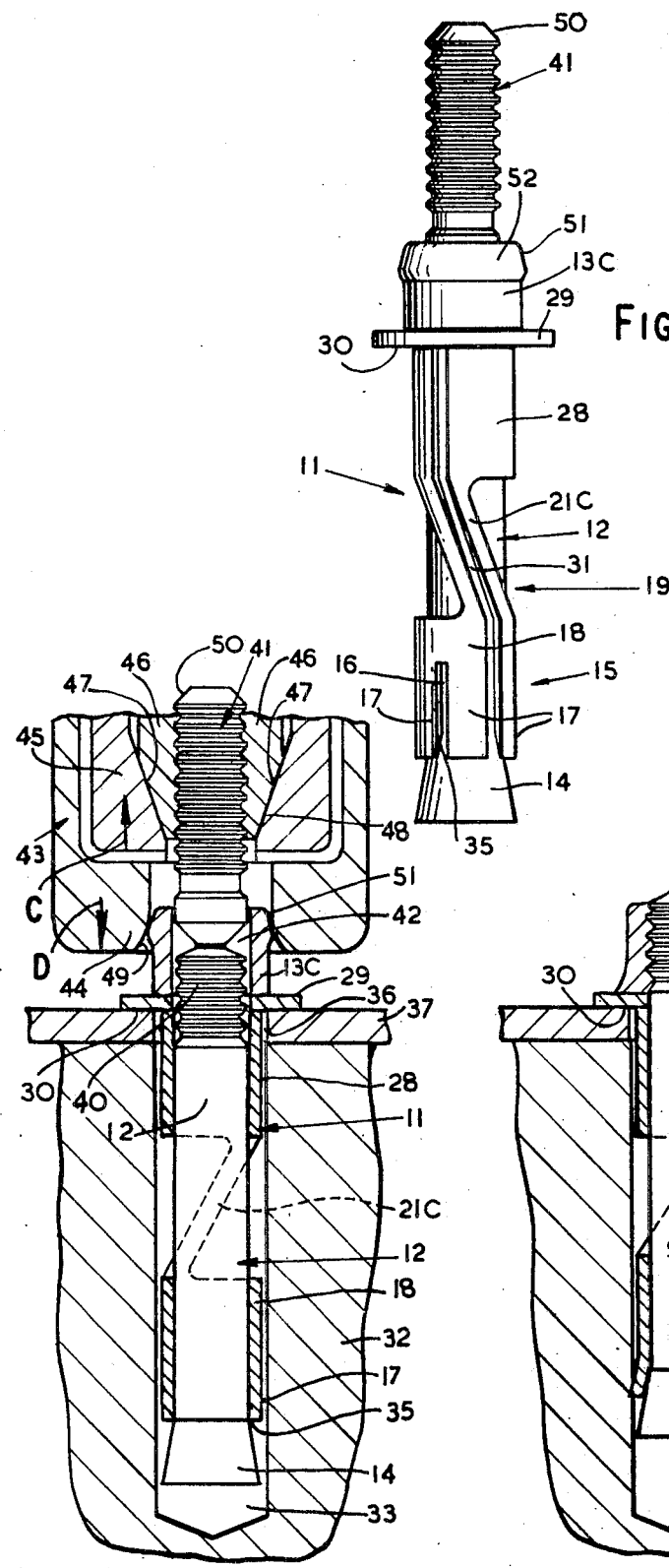
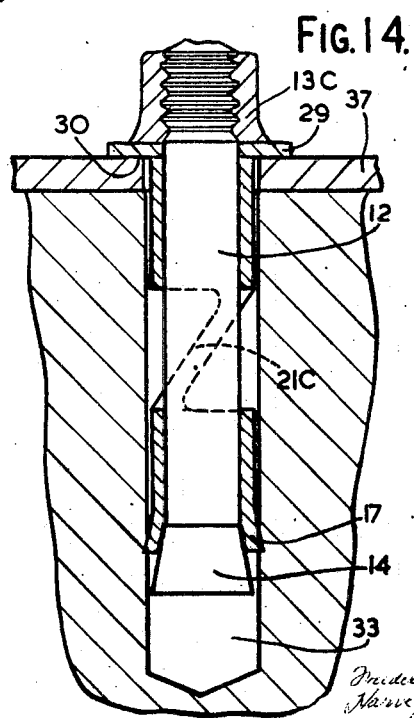
FIG. 12.
FIG. 13.
FIG. 14.

United States Patent Office 3,512,448
Patented May 19, 1970

1

3,512,448
BLIND FASTENER
Frederick Arthur Summerlin, Harpenden, and Harvey Philip Jeal, Stevenage, England, assignors, by mesne assignments, to Aerpat A.G., Zug, Switzerland, a Swiss company
Continuation of application Ser. No. 615,710, Feb. 13, 1967. This application Dec. 18, 1968, Ser. No. 785,866
Claims priority, application Great Britain, Feb. 25, 1966, 8,531/66
Int. Cl. F16b 13/04, 33/04
U.S. Cl. 85—75                                    3 Claims

ABSTRACT OF THE DISCLOSURE

A masonry anchor bolt comprises a bolt-member with a wedge on the inner end. When the bolt is drawn into the tubular shell the wedge expands the inner end of the shell to bite into the wall of the hole. The middle part of the shell comprises a number of struts which are skewed about the axis of the tubular shell. When the bolt is drawn into the shell the middle part of the shell collapses longitudinally by the struts becoming more skewed and at the same time moving radially inwards away from the wall of the hole, so that only the tail end part of the shell engages with the wall of the hole.

---

This application is a continuation of application Ser. No. 615,710, filed Feb. 13, 1967, now abandoned.

The invention relates to blind fasteners.

The invention provides, in one of its aspects, a blind fastener adapted to be anchored in a hole in a body, which fastener comprises a longitudinally tension-supporting member, an enlarged head member at the head end of the fastener, a sleeve-like member surrounding the tension-supporting member which sleeve-like member has an expansible part at its tail end and a longitudinally collapsible part, and expansion means connected to the tension-supporting member at the tail end of the fastener operable to expand the expansible part of the sleeve-like member upon application of tension to the tension-supporting member; the arrangement being such that, when the fastener is inserted into the hole with the head member abutting directly or indirectly against the body surface, and tension is applied to the tension-supporting member between the expansion means and the head member, the expansion means expands the expansible part of the sleeve-like member to grip the wall of the hole, the part of the tension-supporting member adjacent the tail end part of the sleeve-like member being connected to the latter to prevent movement of the tension-supporting member towards the head end of the fastener, so that the head member is clamped directly or indirectly against the body surface and also such that when longitudinal compression is applied between the ends of the sleeve-like member by virtue of the aforesaid tension applied to the tension-supporting member its collapsible part collapses longitudinally so that the sleeve-like member cannot exert any substantial thrust on the head member which would tend to reduce the aforesaid clamping of the head member against the surface.

Preferably the arrangement is such that when the collapsible part collapses it does not thereby increase its engagement with the wall of the hole to an extent which would prevent, or increase resistance to, its longitudinal movement therealong.

Preferably the arrangement of the collapsible part is such that when it collapses it is not increased in transverse dimensions, and preferably it reduces in transverse dimensions.

2

Where the fastener is one in which tension is applied as aforesaid to the tension-supporting member by rotation of, for example, the head member or the tension-supporting member, the sleeve-like member is preferably such that it initially engages the wall of the hole in such a manner as to substantially prevent rotation of itself at least before tension is applied as aforesaid. Conveniently it may be the aforesaid collapsible part of the sleeve-like member which is adapted initially to engage the wall of the hole as aforesaid.

In a preferred form of the invention, the collapsible part of the sleeve-like member is provided by a plurality of substantially longitudinal struts spaced circumferentially around the member and mutually spaced apart by voids, each strut extending in a direction oblique or skewed with respect to the axis of the sleeve-like member, whereby the collapsible part collapses longitudinally by increase in the obliquity or skew of the struts and relative rotation between the two portions of the sleeve-like member which are separated by the collapsible portion.

When the fastener is one in which the collapsible part is adapted to engage the hole wall to substantially prevent rotation as aforesaid, it is preferably arranged that at least some of the struts each include a part extending substantially tangentially of the sleeve-like member to engage the wall as aforesaid. It is preferably arranged that the radially outermost portions of the wall-engaging parts are of lesser radial dimensions towards the tail end of the fastener and increase substantially smoothly in radial dimensions towards the head end of the fastener, thereby to facilitate insertion of the fastener into the hole. It is preferred that the arrangement of the wall-engaging struts is such that when the fastener is inserted into the hole at least one of the wall-engaging struts is slightly resiliently deformed due to contact between its wall-engaging part and the wall, thereby to assist in gripping the wall to substantially prevent rotation as aforesaid. It is also preferred that the wall-engaging portion of each wall-engaging part is substantially longitudinal with respect to the hole, thereby to offer substantially greater resistance to rotation than to longitudinal movement of the sleeve-like member.

Conveniently the expansion means comprises a tapered or wedge-like member which is drawn into the expansible part of the sleeve-like member. In one embodiment of the invention, the wedge-like member and the tension-supporting member are in threaded engagement, whereby rotation of the latter with respect to the former applies tension to the latter and draws the former into the expansible part. Preferably there is provided means for positively restraining relative rotation between the wedge-like member and the tension-supporting member. This may take the form of a radial projection on the wedge-like member which engages with a longitudinal slot or groove in the tail end part of the sleeve-like member.

In another embodiment of the invention, the wedge-like member is secured to, and preferably integral with, the tension-supporting member, and the latter is in threaded engagement with the head member, whereby rotation of the head member relative to the tension-supporting member applies tension to the latter and draws the wedge-like member into the expansible part.

In yet another embodiment of the invention, the tension-supporting member is provided with a portion adapted to be engaged by a suitable tool (e.g. a pull-gun) to apply longitudinal tension to the member. In this case the head member is in the form of a collar which can be swaged into suitable grooves or other deformations on the head end of the tension-supporting member, after the collar has been clamped directly or indirectly to the body surface as aforesaid, to permanently retain that clamping. In this case, preferably the tool-engaging portion is beyond the head end of the tension-supporting member and is joined thereto by a breaker-groove or other weakened fracturable portion.

The sleeve-like member may be formed from a flat sheet (e.g. of metal) which is stamped out to the desired shape and then rolled to form a tube.

Some specific embodiments of the invention will now be described by way of example and with respect to the accompanying drawings in which:

FIG. 1 is an elevation of one form of fastener, the sleeve-like member being shown in longitudinal section;

FIG. 2 is a similar view of the same fastener but with the sleeve-like member shown complete;

FIG. 3 is a similar view to FIG. 2 but showing the fastener anchored in a hole in a wall, the wall being shown in section;

FIG. 4 is a section on the line 4—4 of FIG. 2;

FIG. 5 is a section on the line 5—5 of FIG. 3;

FIGS. 6 to 10 show a second form of fastener in views corresponding to those of FIGS. 1 to 5 respectively;

FIG. 11 is a perspective view of the wedge-like member of the second form of fastener;

FIG. 12 is an elevation of a third form of fastener;

FIG. 13 is a longitudinal section (the tension-supporting member being shown in elevation) through this fastener when being anchored in position by a pull-gun; and FIG. 14 is a view, similar to that of FIG. 13, of the fastener anchored in position.

In these examples, the fasteners ars shown used to clamp a sheet-like member 37 to the surface 34 of a concrete wall 32. The sheet-like member 37 is provided with a suitable hole 36 for the head end of the fastener to pass through, as will be described below.

The fastener shown in FIGS. 1 to 5 comprises a sleeve-like member in the form of a cylindrical steel shell 11, a longitudinally tension-supporting member in the form of a steel bolt 12, and an enlarged head member in the form of a steel nut 13 at the head end of the fastener. Expansion means is provided by a frusto-conical tapered wedge 14 which is formed as an integral enlargement of the tail end of the bolt. The tail end part 15 of the shell has a number of longitudinal slots 16 extending from the tail end of the sleeve towards the head end, dividing the tail end part into a number of arms 17, thereby making it expansible. The diameter of the narrow end of the wedge 14 is the same as that of the bolt, which is a clearance fit inside the shell. The diameter of the wide end of the wedge is less than the outside diameter of the shell, but the length and taper of the wedge are chosen such that the wedge can expand the tail end part of the shell sufficiently to securely anchor it in a hole of suitable diameter such as will be described below. The inside of the tail end of the shell is chamfered slightly at 35 to assist entry of the wedge.

Adjacent the tail end part 15 is an imperforate length 18, next to which is a longitudinally collapsible part 19 which forms the middle part of the sleeve. This collapsible part is provided by a number of substantially longitudinal struts 21 spaced circumferentially around the sleeve and mutually spaced apart by voids 22. In this example, there are three such struts. As illustrated in FIGS. 2 and 3, each strut is skewed or oblique to the axis of the shell. All the struts are skewed in the same direction, so that when looking towards the tail end of the fastener (i.e. as in FIGS. 4 and 5) the tailmost end of each strut is more anti-clockwise than the headmost end. Each strut includes an extension part 23 which extends substantially tangentially of the shell, in an anti-clockwise direction as viewed in FIGS. 4 and 5. The extension extends along most of the length of the strut, except for short portions 24 at each end where the strut joins the adjacent parts of the shell. The part of each strut which includes the extension is tapered towards the tail end of the shell, so that the outermost edge 25 of the extension is radially nearer the axis of the shell at the tailmost end (e.g. at 26 in FIG. 2) than at the headmost end (e.g. at 27) and there is a smooth transition between these radial dimensions along the outer edge 25 of each extension.

Beyond the headmost end of the collapsible part 19 the head end of the shell comprises an imperforate part 28. A washer 29 is positioned between the head end of the shell and the nut 13.

In this fastener the shell 11 is formed from an initially flat sheet of steel of suitable thickness which is stamped out to the desired shape and then rolled into a cylindrical tubular shape. When the sheet is rolled, the extensions 23 on the struts are not bent, but remain unbent so that they project in the manner described. A gap 31 between the two edges of the rolled sheet runs the whole length of the shell.

FIGS. 3 and 4 show the fastener anchored in a concrete wall 32. A hole 33 is first drilled in the wall, perpendicular to its surface 34. The diameter of the hole must be larger than the outside diameter of the parts 18 and 28 of the shell but smaller than the diameter of the circle defined by the radially outermost ends 27 of the extensions 23. The diameter of the hole should preferably be the same as that of the circle defined by the radially innermost ends 26 of the extensions. The depth of the hole must be sufficient to accommodate the length of the shell plus the tapered expander wedge 14 which projects from it.

The fastener is normally supplied and sold assembled as shown in FIGS. 1 and 2, and preferably with the nut 13 tightened slightly to draw the wedge 14 into the chamfer 35 to prevent rattling. To use the fastener, the nut 13 is unscrewed from the head end of the bolt and the washer is also removed. The tail end of the fastener is inserted into the mouth of the hole 33. The tailmost end 26 of the extensions 23 enters the mouth of the hole, and as the fastener is pushed further into the hole the smooth outside edge 25 of each extension enables the shell to be pushed in easily whilst the extensions are slightly deformed as they enter the mouth of the hole. The fastener is pushed in until sufficient of the head end 28 of the shell protrudes from the hole to be rather greater than the thickness of the sheet-member 37 which is to be clamped to the surface of the wall. The sheet 37 is then placed against the wall surface, so that the head end of the fastener shell lies within a preformed aperture 36 in the sheet. The washer 29 is then placed over the head end of the bolt, in contact with the outermost end of the shell, and the nut 13 screwed down on the head end of the bolt to contact the washer.

Alternatively the sheet 37 may be placed in position on the wall surface, with the aperture 36 overlying the mouth of the hole 33, the fastener then being inserted first through the aperture 36 then into the hole 33 without removing the nut and washer. In this case, the hole at 36 is preferably oversize; that is to say, it is of sufficiently large diameter that the outermost edges 25 of the shell strut extensions 23 do not interfere with the edges of the hole 36 as the fastener is passed through.

In either case, the fastener is thus placed in position with the headmost end of the shell just projecting beyond the outer surface of the sheet 37, and with the wedge 14 abutting the chamfer 35 at the tail end of the shell.

The nut is then tightened on the bolt (the engagement between the edges of the strut extensions 23 and the wall of the hole 33 prevents rotation of the shell in the hole), thus applying tension to the bolt between the wedge 14 and the nut 13. The reaction on the nut is supported through the washer 29 against the headmost end 30 of the shell. The weakened portions 24 of the struts are sufficiently strong to support a longitudinal compression thrust in the shell which enables the bolt to pull the wedge 14 into the tail end portion 15 of the shell, causing the arms 17 to bite into the concrete. This in turn in due course prevents any further movement of the tail end 15 towards the head end of the fastener and thus anchors the tail end of the fastener securely in the wall.

As the nut 13 is further tightened down, the wedge 14 is jammed in the tail end of the shell so that the bolt 12 cannot move further towards the head end of the shell. Consequently the longitudinal compression on the shell increases to a value at which the collapsible portion 19 collapses. Shortening of the collapsible portion is accommodated by deformation of the portions 24 and an increase of the skew of the struts. The tail end part 15 of the shell is locked by the arms 17 biting into the hole wall. Consequently the skewing movement of the struts has the effect of rotating the headmost part 28 of the shell with respect to the tailmost part 18, 15. This rotation takes place in the direction in which the headmost parts of the struts are already displaced with respect to the tailmost parts. This is apparent from comparison of FIGS. 2 and 3. It will be seen that the angular position of the tail end part of the shell about its axis is the same in FIGS. 2 and 3, whereas in FIG. 3 the head part 28 of the shell has rotated in a clockwise direction (when looking towards the tail end of the fastener, as in FIGS. 4 and 5) with respect to the head end of the shell. Consequently the struts tend to deform circumferentially around the shell rather than radially outwards. The relative rotation of the head end 28 of the fastener with respect to the tail end 18 tends to bring the centre part of each strut nearer to the bolt 12. This tends to reduce the extent to which the collapsible portion 19 of the shell engages with the wall of the hole 33, when the struts are thus deformed.

Longitudinal collapse of the shell thus brings the washer 29 into contact with the sheet 37, pressing the sheet into contact with the wall. As the shell offers substantially no thrust against the washer, substantially the whole of the tension force in the bolt 12 is available for clamping the sheet 37 tightly against the wall surface 34. As the nut 13 is tightened the frictional engagement between the nut and the washer 29 in due course prevents any further tightening of the nut. The sheet 36 is thus then securely clamped to the wall surface by the nut 13.

If the fastener is initially inserted in the hole 33 with the headmost end 30 of the shell below the outer surface of the sheet 37, the initial stages of tightening the nut pull the bolt and shell towards the head end until the shell abuts the washer 29.

The fastener illustrated in FIGS. 6 to 10 is essentially similar to that illustrated in FIGS. 1 to 5, like parts being indicated by like reference numerals. The construction and operation of the fastener of FIGS. 6 to 10 are substantially similar to those of the fastener just described with reference to FIGS. 1 to 5, with the exception that the head member is provided by a hexagonal head 13a formed integrally on the bolt 12, and the wedge-like member is separate from the bolt 12 and is in the form of a frusto-conical wedge 14a in threaded engagement with the tailmost end of the bolt 12. In this fastener tension is applied between the bolt head 13a and the wedge 14a by rotating the bolt in a clockwise sense (as viewed in FIGS. 9 and 10) to screw the wedge up the bolt. In order to prevent the wedge rotating it is formed with a small pointed radial projection or pip 14b at its narrow end, which engages one of the slots 16 in the tail end of the shell.

Although it might be possible for the wedge 14a to be gripped and retained by the arms 17 without becoming dislodged, so that the bolt could be inserted into the shell after the sheet-member 37 has been placed over the headmost end of the shell protruding from the hole 33, it is preferable for the sheet-member 37 to be placed in position on the surface 34 with its aperture 36 overlying the mouth of the hole 34, and the assembled fastener then inserted through the aperture 36. The hole 33 in the wall may be drilled after the sheet 37 has been placed in position.

The third form of fastener, shown in FIGS. 12, 13 and 14, is somewhat similar to that shown in FIGS. 1 to 5, and like parts are indicated by like reference numerals. However, in this fastener tension is applied to the bolt 12 by means of a direct axial pull, instead of by relative rotation of screw threaded members. This pull is obtained by using a pull-gun (which may, for example, be hydraulically actuated) part of which is shown in section in FIG. 13.

The head end of the bolt 12 is provided with an axial extension 41, having annular grooves which can be gripped by the gun. The extension 41 is separated from the bolt by a breaker groove 42. The head member is provided by a deformable metal collar 13c, surrounding circumferential grooves 40 in the head end of the bolt, into which the collar is swaged by the action of the pull-gun.

The pull-gun includes a body-member 43 formed at its outer end with an annular anvil 44. Inside the body-member is a movable collet 45 containing a pair of jaws 46 which have grooved interior faces for engaging with the grooves on the bolt extension 41. The outsides of the jaws are frusto-conical in shape at 47, nearer the anvil end of the bodymember, and engage a corresponding frusto-conical interior part 48 of the collet 45.

In use of this fastener, the tail end of the fastener is inserted through the aperture 36 in the sheet-member 37 and into the hole 33 in the wall 32, with the washer 29 between the collar 13c and the member 37. The mouth of the pull-gun is then placed over the extension 41 of the bolt until the chamfered edge 49 of the inside of the annular anvil meets the frusto-conical upper face 51 of an annular rib 52 around the end of the collar 13c remote from the washer 29. The pull-gun is pushed towards the wall so that the collar 13c presses the washer 29 against the sheet 37 or against the headmost end 30 of the shell. The end of the extension 41 is bevelled at 50 so that the extension pushes the jaws 46 backwards and apart and enters between them. The jaws are sprung in the opposite direction (i.e. towards the anvil) so that the frusto-conical surface 48 urges them together to positively engage the extension 41 by means of the grooves in it. This is the position shown in FIG. 13. The pull-gun is then actuated so that the collet 45 is pulled inwardly (in the direction of arrow C in FIG. 13) with respect to the anvil (the reaction on the anvil being in the opposite direction indicated by arrow D in FIG. 13) with a considerable force.

The wedge 14 meets the tailmost end of the shell 11 and moves the shell towards the head end of the bolt until the headmost end 30 of the shell abuts the washer 29 if it is not already doing so. Thus tension is applied to the bolt 12 and longitudinal compression is applied to the shell 11. The wedge 14 enters the expansible tail end part 15 of the shell and forces the arms 17 apart to bite into the wall of the hole 33. The bolt 12 continues to be pulled towards the head of the fastener, jamming the wedge 14 in the tail end of the shell, and the collapsible part of the shell then collapses longitudinally by an increase in the skew of the struts 21c and relative rotation between the parts 18 and 28 of the shell. The bolt 12 cannot then move any further towards its head end, and the sheet-member is pressed firmly against the wall surface 34. Consequently the reaction applied by the anvil 44 of the pull-gun to the collar 13c deforms the collar. The anvil moves towards the tail end of the bolt until it abuts the washer 29. This swages the metal of the collar into the grooves 40 on the bolt, thus locking the collar to the bolt head, and securing the sheet-member to the wall. As the pull exerted by the pull-gun increases still further, the extension 41 breaks off at the breaker groove 42 and is retained by the jaws when the pull-gun is removed. The fastener is thus anchored into the wall, as shown in FIG. 14.

The fasteners described in the foregoing examples have a number of practical advantages in use. The fastener bites into the wall of the hole only at the tail end part of the fastener, which is well below the surface of the body (i.e. the wall) in which the fastener is embedded. This is less likely to cause splitting or breaking of the body than a fastener which bites into the wall part of the way along the fastener, i.e. much nearer the surface. Consequently the fasteners of the foregoing examples are likely to provide stronger and safer anchorages.

Another advantage arising from the feature that the collapsible part of the shell does not bite into the wall of the hole is that there is therefore no tendency to hinder further longitudinal collapse of this part. This hinderance, if it occurred, might support the headmost end of the shell sufficiently to substantially reduce the clamping of the head member against the surface.

The particular construction of the shells of these fasteners is also advantageous. The tendency of the skewed struts to be pulled inwards towards the bolt as they collapse counteracts any tendency there might be for them to be pushed outwards against the hole wall.

The fasteners of these examples may be initially inserted into the hole 33 in the wall or other body with the headmost end 30 of the shell either just below, level with, or just outside the outer surface of the sheet-member 37 (or the surface 34 of the body if the fastener is used without a sheet member, as suggested below). However, the headmost end of the shell must not project more than the distance which can be accommodated by longitudinal collapse of the shell.

The invention is not restricted to the details of the foregoing examples. For instance, other configurations of shell design, and bolt design, are possible. The fastener may obviously be used to clamp members other than sheet members against a wall surface, for example a hook, stay, or other form of support. Alternatively the auxiliary member may be omitted, and a connection may be made to the head member or the projecting end of the bolt.

The shell may be provided with more than three struts, particularly in larger sizes of fasteners. Shells of different diameters for different diameter fasteners may be made by cutting off and rolling up appropriate length of the same pattern of stamped-out metal strip.

We claim:
1. A masonry anchor comprising: a bolt member having an enlarged head member at one end thereof and an expander wedge at the other end thereof; and a deformable shell around said bolt extending between said head member and said expander wedge, one end of said shell being expandable by said expander wedge when said bolt is tightened; said shell having two substantially tubular end parts connected to each other by a plurality of struts, each strut being substantially straight, unbroken and imperforate throughout its length, and all the struts being oblique or skewed in the same direction with respect to the length of said shell, said struts all having substantially the same length so that when said bolt is placed in tension, said shell between said tubular end parts is deformed by increasing the degree of skew of said struts and decreasing its axial length without materially changing its internal or external diameter between said end parts.

2. A masonry anchor as claimed in claim 1, in which each said strut is joined at each end to the adjacent tubular end parts by a weakened portion.

3. A masonry anchor comprising: a bolt member having an enlarged head member at one end thereof and an expander wedge at the other end thereof; and a deformable shell around said bolt extending between said head member and said expander wedge, one end of said shell being expandable by said expander wedge when said bolt is tightened; said shell having two substantially tubular end parts connected to each other by a plurality of struts, each strut being substantially straight, unbroken and imperforate throughout its length, and all the struts being oblique or skewed in the same direction with respect to the length of said shell, said struts all having substantially the same length so that when said bolt is placed in tension, said shell between said tubular end parts is deformed by increasing the degree of skew of said struts and decreasing its axial length, said struts being jointed to said tubular end parts by portions of reduced cross section and each of said struts prior to deformation of said anchor including a longitudinal edge which is spaced radially outward from said bolt a distance greater than said portions of reduced cross section, the radial spacing being greater adjacent the head and the tail portion thereof and there being a smooth transition between the portions of greatest and least radial spacing of said edge portion.

References Cited
UNITED STATES PATENTS

| | | |
|---|---|---|
| 1,293,844 | 2/1919 | Malaby. |
| 1,394,925 | 10/1921 | Marshall. |
| 2,762,252 | 9/1956 | Karitzky. |
| 3,171,322 | 3/1965 | Kaplan. |

FOREIGN PATENTS

| | | |
|---|---|---|
| 608,218 | 9/1948 | Great Britain. |
| 338,589 | 7/1959 | Switzerland. |
| 344,832 | 4/1960 | Switzerland. |

MARION PARSONS, JR., Primary Examiner

U.S. Cl. X.R.

85—77